United States Patent [19]

Suzuki

[11] Patent Number: 5,790,351

[45] Date of Patent: Aug. 4, 1998

[54] MAGNETORESISTIVE HEAD WITH CONDUCTIVE UNDERLAYER

[75] Inventor: Tetsuhiro Suzuki, Tokyo, Japan

[73] Assignee: Nec Corporation, Tokyo, Japan

[21] Appl. No.: 677,336

[22] Filed: Jul. 2, 1996

[30] Foreign Application Priority Data

Jul. 7, 1995 [JP] Japan .................. 7-171716

[51] Int. Cl.[6] ........................................... G11B 5/33
[52] U.S. Cl. .............................................. 360/113
[58] Field of Search ...................................... 360/113

[56] References Cited

U.S. PATENT DOCUMENTS 5,491,600 2/1996 Chen et al. ..................... 360/113
5,581,427 12/1996 Feng et al. ..................... 360/113
5,608,593 3/1997 Kim et al. ...................... 360/113

FOREIGN PATENT DOCUMENTS 3-125311 5/1991 Japan .

Primary Examiner—John H. Wolff
Attorney, Agent, or Firm—Sughrue, Mion, Zinn, Macpeak & Seas, PLLC

[57] ABSTRACT

In a magnetoresistive head, in which a longitudinal bias magnetic field application permanent magnet film 5 and an electrode 6 are disposed on each side of an MR element 4, the MR element 4, permanent magnet film 5 and electrode 6 are formed on a conductive under layer 3.

26 Claims, 3 Drawing Sheets

FIG. 5

UPPER LIMIT OF THICKNESS OF UNDER LAYER (OUTPUT REDUCTION : 70%)

| MATERIAL | RESISTIVITY ($\mu\Omega$cm) | THICKNESS UPPER LIMIT ($\Omega$m) |
|---|---|---|
| Cr | 60 | 10.7 |
| NiMn | 70 | 12.5 |
| Ta | 200 | 35.8 |
| Ti | 50 | 8.9 |
| Cu | 20 | 3.6 |

FIG. 6

RESULT OF EVALUATION

| HEAD | AVERAGE REPRODUCTION OUTPUT ($\mu$V) | DEVIATION OF REPRODUCTION OUTPUT ($\mu$V) | AVERAGE EFFECTIVE TRACK WIDTH ($\mu$m) | DEVIATION OF EFFECTIVE TRACK WIDTH ($\mu$m) |
|---|---|---|---|---|
| Embodiment 1 | 580 | 50 | 2.0 | 0.1 |
| Embodiment 2 | 600 | 55 | 2.1 | 0.1 |
| Embodiment 3 | 1,250 | 190 | 1.9 | 0.1 |
| Prior Art | 810 | 180 | 2.3 | 0.2 |

MAGNETORESISTIVE HEAD WITH CONDUCTIVE UNDERLAYER

BACKGROUND OF THE INVENTION

The present invention relates to magnetoresistive heads (hereinafter referred to as MR heads) comprising a magnetoresistive element (hereinafter referred to a MR element), which is capable of reading out magnetic data from a magnetic recording medium by utilizing magnetoresistive effect.

MR heads can provide high outputs which are independent of the relative speed of the head and recording medium. Extensive research and investigations have been made with an aim of developing small size, high density magnetic recording devices as reproduction heads. For the MR head to be used as the head for reproducing the signal recorded by high track density magnetic recording, it is necessary to determine the track width of the head with high accuracy. In addition, in order to suppress Barkhausen noise which is particularly pronounced with the narrow track widths, it is necessary to provide a structure for realizing a singe magnetic domain of an MR element and apply a bias magnetic field in a sense current direction (hereinafter referred to as a longitudinal bias magnetic field).

FIG. 4 is a sectional view showing a prior art MR head taken along a plane facing the disk. This MR head is disclosed in Japanese Laid-Open Patent Publication No. 3-125311, and its track width is prescribed by the sole width of the MR element. In this MR head, the longitudinal bias magnetic field is applied by permanent magnet films formed on both sides of the MR element. This prior art MR head is produced as follows.

As shown in FIG. 4, a lower shield 1 and a lower gap 2 are formed as in Embodiment 1 which will be described later. Then, an MR element layer 4 including a CoZrMo film of 200 nm in thickness as a soft adjacent layer, a Ta film of 10 nm in thickness as a separating layer and a NiFe film of 15 nm in thickness as a magnetoresistive layer, is spattering formed. Then, the MR element layer 4 is given a stencil type resist and then ion milling patterned to a width of 2 μm. In this step, the MR element layer 4 is tapered to about ten degrees in order to guarantee its electric coupling to a permanent magnet layer to be formed subsequently. A Cr film of 10 nm in thickness is spattering formed as a ground (not shown), on which the permanent magnet layer to be formed is to be disposed, on each side of the patterned MR element. Then, a CoCrPt film of 20 nm in thickness as a permanent magnet layer 5 and a Au layer of 0.2 μm in thickness as an electrode layer 6, are spattering formed, and then the resist is removed. Subsequently, an upper gap 7 and an upper shield 8 are formed in a manner as in Embodiment 1.

In this prior art MR head structure, however, it is necessary to couple together the MR element layer 4 and the permanent magnet layer 5 both magnetically and electrically. This means that the MR element layer 4 has to be given a gentle taper, which dictates a rather difficult process. In addition, the accuracy of the track width is dependent on the accuracy of the gentle taper to be formed, and this gives rise to yield deterioration in the manufacture of narrow track heads. Moreover, the resistance of the element and Barkhousen noise may fluctuate in dependence on the state of contact between the MR element layer 4 and the permanent magnet film 5.

SUMMARY OF THE INVENTION

The present invention has been made in view of the above drawbacks inherent in the prior art, and it has an object of providing an MR head, which permits accurate track width determination and is subject to less fluctuations of the reproduction output, element resistance and Barkhousen noise.

According to the present invention, there is provided a magnetoresistive head in which a longitudinal bias magnetic field application permanent magnet film and an electrode are disposed on each side of a magnetoresistive element, the magnetoresistive element, permanent magnet film and electrode being formed on a conductive ground layer. The longitudinal bias magnetic field application structure is disposed on each side of the magnetoresistive element to be magnetically coupled each other. The magnetoresistive element layer and the longitudinal bias magnetic field application structure are patterned to be of the same shape, and the electrode is disposed in contact with or in a spaced-apart relation to each side of the shaped structure. The longitudinal bias magnetic field application structure mainly includes a permanent magnet film. The conductive under layer is made of a material serving as the ground of the permanent magnet film. The magnetoresistive element layer and the longitudinal bias magnetic field application structure are constituted by a ferromagnetic magnetoresistive film, a permanent magnet film and a film magnetically isolating the ferromagnetic magnetoresistive film and the permanent magnet film from each other, the permanent magnet film applying a transversal bias magnetic field and a longitudinal bias magnetic field to the ferromagnetic magnetoresistive film. The magnetoresistive element layer includes a ferromagnetic magnetoresistive film and a transversal bias magnetic field application structure. The magnetoresistive element includes a first ferromagnetic layer pinned by an anti-ferromagnetic layer, a conductive intermediate layer and a second ferromagnetic layer.

The conductive under layer is an anti-ferromagnetic film. The magnetoresistive element includes a first ferromagnetic layer, a conductive intermediate layer and a second ferromagnetic layer. The longitudinal bias magnetic field application structure is a soft magnetic layer coupled to the anti-ferromagnetic layer. The conductive under layer has a resistance given as:

$$Ru > Rm/((Vu/Vm)^{-2/3} - 1)$$

where Ru is the sheet resistance of the conductive under layer, Rm is the sheet resistance of the MR element, and Vu and Vm are outputs in the cases of the presence and absence of the under layer, respectively.

According to other aspect of the present invention, there is provided a magnetoresistive head comprising a magnetoresistive element layer, a longitudinal bias magnetic field application structure and an electrode, wherein the magnetoresistive element layer, the longitudinal bias magnetic field application structure and the electrode are disposed on a conductive under layer.

With the MR head according to the present invention, the electric coupling is guaranteed by a conductive ground, thus permitting head structure design without consideration of any electric coupling between the MR element and the electrodes or longitudinal bias magnetic field application structure, for instance a permanent magnet film. It is therefore possible to determine the track width accurately without need of giving the MR element any gentle taper. In addition, the fluctuations of the element resistance can be reduced because a current path via the under layer is guaranteed. Furthermore, with an arrangement using a permanent magnet film as the longitudinal bias magnetic field application structure and a conductive under layer as a ground material for the permanent magnet, the direction of magnetization of the permanent magnet lies in the plane of the MR element, so that stable longitudinal bias can be supplied to the MR element.

With the MR head according to the present invention, due to an effect of current branching by the conductive under layer the reproduction output is reduced compared to the case where no under layer is provided. Assuming a constant power R×I² (R is resistance and I is current in the MR element, the reduction of the reproduction output is given as:

$$Vu/Vm=(1+Rm/Ru)^{-\frac{1}{2}}$$

where Ru and Rm are the sheet resistances of the under layer and the MR element, respectively, and Vu and Vm are the outputs in the cases of presence and absence of the under layer, respectively. Thus, in the magnetic recording system an MR head with less reproduction output reduction influence can be obtained by selecting the sheet resistance of the ground layer in correspondence to the permissible output reduction.

Other objects and features will be clarified from the following description with reference to attached drawings.

BRIEF DESCRIPTION OF THE DRAWINGS

FIG. 5 shows the upper limit on the thickness of the under layer as a function of the resistivity of various materials according to one embodiment of the present invention.

FIG. 6 shows measurements corresponding to the reproduction output, average value, and deviation of the effective track width associated with the present invention.

DETAILED DESCRIPTION OF PREFERRED EMBODIMENTS

MR heads according to the present invention will now be described with reference to the drawings.

Figure 1:
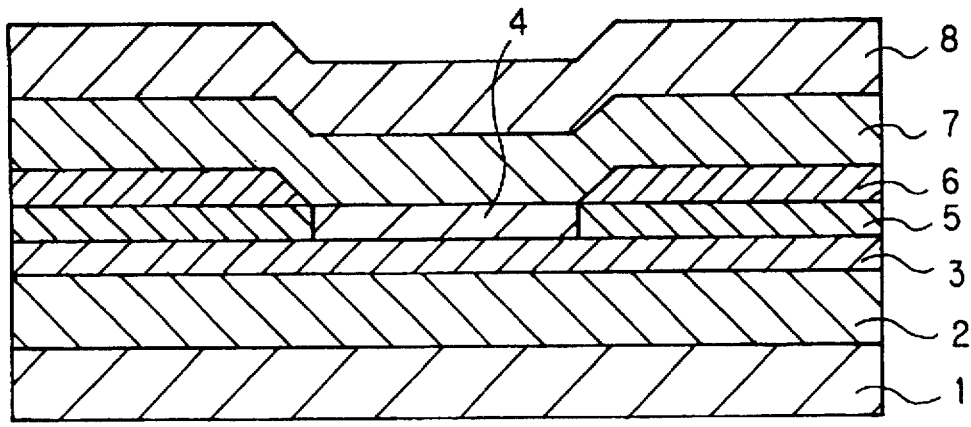
FIG. 1 is a sectional view showing an MR head according to Embodiment 1 taken along plane facing the disk.

FIG. 1 is a sectional view showing an MR head according to Embodiment 1 taken along plane facing the disk. As shown in the Figure, a lower shield 1 of NiFe of 2 µm in thickness is plating formed on a non-magnetic ceramic substrate (not shown) and ion milling patterned to a width of 60 µm. A lower gap 2 of Al₂O₃ of 0.2 µm in thickness is then spattering formed on the lower shield 1. Then, a Cr film of 10 nm in thickness is spattering formed as a conductive under layer 3. The Cr film also serves the role of a ground, in which a CoCrPt film is formed later.

Then, an MR element layer 4 including a CoZrMo film of 20 nm in thickness as a soft adjacent layer, a Ta film of 10 nm in thickness as an intermediate layer, and a NiFe film of 15 nm in thickness as a ferromagnetic magnetoresistive layer, is spattering formed. The MR element layer 4 is then given stencil type resist and ion milling patterned to a width of 2 µm. Then, a permanent magnet layer 5 consisting of a CoCrPt film of 50 nm in thickness and an electrode layer 6 consisting of a Au film of 0.2 µm in thickness, are spattering formed on each side of the patterned magnetic film, and the resist is formed. An upper gap 7 of Al₂O₃ of 0.24 µm in thickness is then spattering formed. An upper shield 8 of NiFe of 2 µm in thickness is then plating formed and ion milling patterned to a width of 60 µm.

Figure 2:
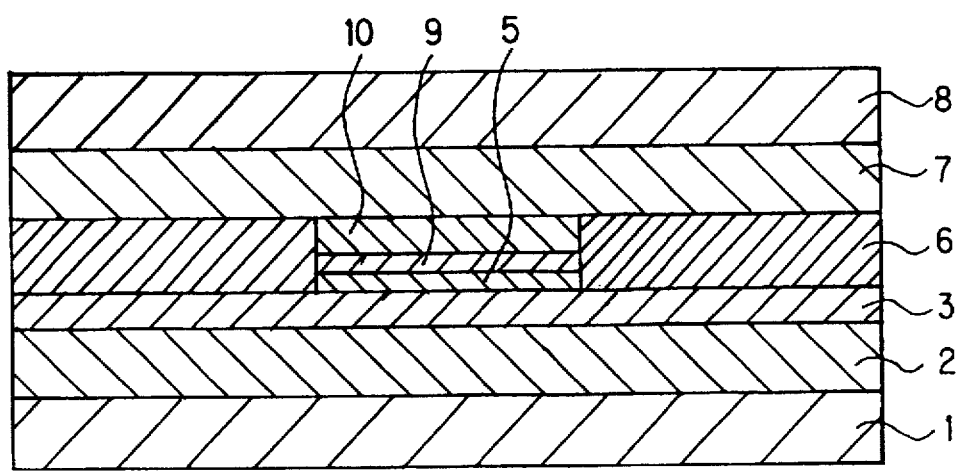
FIG. 2 is a sectional view showing an MR head according to Embodiment 2 of the present invention taken along a plane facing the disk.

FIG. 2 is a sectional view showing an MR head according to Embodiment 2 of the present invention taken along a plane facing the disk. As shown in the Figure, a lower shield 1 of NiFe of 2 µm in thickness is plating formed on a non-magnetic ceramic substrate (not shown), and ion milling patterned to a width of 60 µm. A lower gap 2 of Al₂O₃ of 0.2 µm in thickness is spattering formed. A Cr film is then formed as a conductive under layer 3. A CoCrPt film of 20 nm in thickness is then spattering formed as a permanent magnet film 5. The permanent magnet film 5 is magnetized at an angle of 45 degrees to the track width direction, whereby both transversal and longitudinal fields are applied to the magnetoresistive film. Subsequently, a Ti film of 10 nm in thickness as an intermediate layer 9 and a NiFe layer of 15 nm in thickness a s a ferromagnetic magnetoresistive layer 10, are spattering formed. The permanent magnet film 5, intermediate layer 9 and ferromagnetic magnetoresistive layer 10 are given stencil type resist and ion milling patterned to a width of 2 µm. An electrode layer 6 of Au 0.2 µm in thickness, is then spattering formed on each side of the patterned magnetic film, and then the resist is removed. An upper gap 7 of Al₂O₃ of 0.24 µm in thickness is then spattering formed. An upper shield 8 of NiFe of 2 µm in thickness is then plating formed and ion milling patterned to a width of 60 µm.

Figure 3:
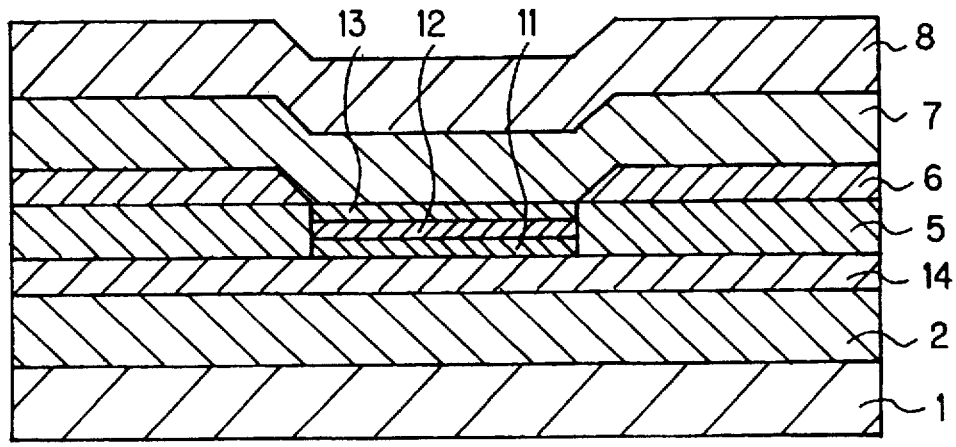
FIG. 3 is a sectional view showing an MR head according to Embodiment 3 of the present invention taken along a plane facing the disk.
Figure 4:
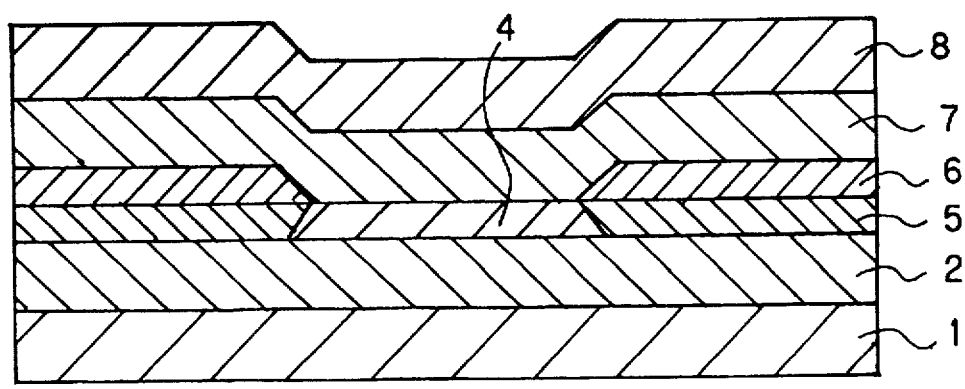
FIG. 4 is a sectional view showing a prior art MR head taken along a plane facing the disk.

FIG. 3 is a sectional view showing an MR head according to Embodiment 3 of the present invention taken along a plane facing the disk. As shown in the Figure, a lower shield 1 of NiFe of 2 µm in thickness is plating formed on a non-magnetic ceramic substrate (not shown) and ion milling patterned to a width 60 µm. Then, a lower gap 2 of Al₂O₃ of 0.2 µm in thickness is spattering formed. A NiMn film of 10 nm in thickness is then spattering formed as a conductive under layer 14. A first ferromagnetic layer 11 of NiFe of 10 nm in thickness, an intermediate layer 12 of Cu of 5 nm in thickness, and a second ferromagnetic layer 13 of NiFe of 10 nm in thickness, are spattering formed. The first ferromagnetic layer 11 is pinned by the NiMn under layer in the height direction of the MR head.

Subsequently, a stencil type resist is provided, and the first ferromagnetic layer 11, intermediate layer 12 and second ferromagnetic layer 13 are ion milling patterned to a width of 2 µm. Then, a Cr film of 10 nm in thickness as a permanent magnet film ground layer (not shown), a CoCrPt film of 10 nm in thickness as a transversal bias magnetic field application permanent magnet film 5 and an electrode layer 6 of Au of 0.2 µm in thickness, are spattering formed, and the resist is removed. An upper gap 7 of Al₂O₃ of 0.24 µm in thickness is then spattering formed. An upper shield 8 of NiFe of 2 µm in thickness is then plating formed and ion milling patterned to a width of 60 µm.

In Embodiments 1 and 2, as the under layer a Cr layer was used, which is also effective as a permanent magnet ground layer. In Embodiment 3, NiMn constituting an anti-ferromagnetic layer was used as a conductive under layer. However, the ground layer may also be of a different material, such as Ta, Ti, Cu, etc., so long as it is a conductive film. Here, the sheet resistance of the under layer must be higher than that cohich is determined by the equation (2) for the reproduction output reduction. In the case where the sheet resistance of the MR element is 15 Ω and the permissible output reduction is 70%, the sheet resistance of the under layer should be 56 Ω or above. Using the resistivities of various materials the upper limits of the thicknesses of the ground layer is as shown in FIG. 5.

In Embodiment 2, the electrode and the MR element are in contact with each other, but they may not be in contact, and in this case the reproduction characteristics are not affected. In this case, however, the MR element has a portion in which current flows only through the under layer, so that its resistance is increased. In Embodiments 1 and 3, the permanent magnet film and the MR element should be in contact with each other magnetically, although they may not be so electrically.

In the above embodiments, the recording and reproduction were evaluated using different heads, but it is of course possible to apply the present invention to a magnetic head, in which a recording head is laminated on the upper shield.

In the above embodiments the permanent magnet film was used as the longitudinal bias magnetic field application structure, but it may be replaced with a structure, in which a soft magnetic material is pinned by an anti-ferromagnetic material.

100 MR heads according to each of the embodiments of the present invention and the equal number of prior art MR heads, were slider processed, and their reproduction output and off-track characteristics were measured. As the recording medium was used a CoCrPt thin film elongate medium with a coercive force of 2,000 Oe, a saturated flux density of 5,000 Gauss and a thickness of 30 nm. The flying height was 0.08 μm. The recording was made with the same thin film head. FIG. 6 shows results of measurement of the reproduction output and the average value and deviation σ of the effective track width (defined as half value of off-track characteristic).

Referring to FIG. 6, with the MR heads of the embodiments the fluctuations of the reproduction output and track width deviation are both small, that is, these heads can be produced with high yield. With the prior art MR heads, the reproduction output and track width fluctuations are large. This is thought to reflect fluctuations of the shape and resistance of the contact section between the permanent magnet layer and the MR element. Barkhausen noise was not observed at all with the heads according to the embodiments, but it was observed in a proportion of 10% with the prior art heads.

As has been described in the foregoing, with the MR head according to the present invention the MR element, longitudinal bias magnetic field application structure and electrode are disposed on the conductive under layer, and it is thus possible to generate current in the MR element irrespective of whether the element is in contact with the electrode or the longitudinal bias magnetic field application structure. It is thus possible to simplify the structure between the MR element and the electrode or the longitudinal bias magnetic field application structure and produce MR heads with satisfactory yield.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A magnetoresistive head comprising:
   a conductive underlayer;
   a magnetoresistive element layer;
   a pair of longitudinal bias magnetic field application structures; and
   a pair of electrodes which are each formed on a respective one of said pair of structures;
   wherein one of said pair of structures and one of said pair of electrodes are disposed about a first portion of an outer surface of said magnetoresistive element layer;
   wherein another one of said pair of structures and another one of said pair of electrodes are disposed about a second portion of an outer surface of said magnetoresistive element layer, and
   wherein said magnetoresistive element layer and said pair of structures are formed directly on an upper surface of said conductive underlayer.

2. The magnetoresistive head according to claim 1, wherein the pair of longitudinal bias magnetic field application structures and the magnetoresistive element layer are magnetically coupled together.

3. The magnetoresistive head according to claim 1, wherein the magnetoresistive element layer and the pair of longitudinal bias magnetic field application structures are patterned to be of the same shape.

4. The magnetoresistive head according to one of claims 1 to 3, wherein the pair of longitudinal bias magnetic field application structures each comprise a permanent magnet film.

5. The magnetoresistive head according to claim 4, wherein the magnetoresistive element layer includes a ferromagnetic magnetoresistive film.

6. The magnetoresistive head according to claim 4, wherein the magnetoresistive element layer includes a first ferromagnetic layer pinned by said conductive underlayer, a conductive intermediate layer and a second ferromagnetic layer, said conductive underlayer comprising an anti-ferromagnetic layer.

7. The magnetoresistive head according to claim 4, wherein the conductive underlayer has a resistance given as $$Ru > Rm/((Vu/Vm)^{-\frac{2}{3}} - 1)$$

where Ru is the sheet resistance of the conductive underlayer, Rm is the sheet resistance of the magnetoresistive element layer, Rm is the sheet resistance of the magnetoresistive element layer, and Vn and Vm are outputs in the cases of the presence and absence of the conductive underlayer, respectively.

8. The magnetoresistive head according to claim 4, wherein the conductive underlayer is made of a material serving as the ground of the permanent magnet film.

9. The magnetoresistive head according to claim 8, wherein the magnetoresistive element layer includes a ferromagnetic magnetoresistive film.

10. The magnetoresistive head according to claim 8, wherein the magnetoresistive element layer includes a first ferromagnetic layer pinned by said conductive underlayer, a conductive intermediate layer and a second ferromagnetic layer, said conductive underlayer comprising an anti-ferromagnetic layer.

11. The magnetoresistive head according to claim 8, wherein the conductive underlayer has a resistance given as $$Ru > Rm/((Vu/Vm)^{-\frac{2}{3}} - 1)$$

where Ru is the sheet resistance of the conductive underlayer, Rm is the sheet resistance of the magnetoresistive element layer, Rm is the sheet resistance of the magnetoresistive element layer, and Vn and Vm are outputs in the cases of the presence and absence of the conductive underlayer, respectively.

12. The magnetoresistive head according to one of claims 1 to 3, wherein the magnetoresistive element layer includes a ferromagnetic magnetoresistive film.

13. The magnetoresistive head according to claim 12, wherein the conductive underlayer has a resistance given as $$Ru>Rm/((Vu/Vm)^{-2/3}-1)$$

where Ru is the sheet resistance of the conductive underlayer, Rm is the sheet resistance of the magnetoresistive element layer, Rm is the sheet resistance of the magnetoresistive element layer, and Vn and Vm are outputs in the cases of the presence and absence of the conductive underlayer, respectively.

14. The magnetoresistive head according to one of claims 1 to 3, wherein the magnetoresistive element layer includes a first ferromagnetic layer pinned by said conductive underlayer, a conductive intermediate layer and a second ferromagnetic layer, said conductive underlayer comprising an anti-ferromagnetic layer.

15. The magnetoresistive head according to claim 14, wherein the conductive underlayer has a resistance given as $$Ru>Rm/((Vu/Vm)^{-2/3}-1)$$

where Ru is the sheet resistance of the conductive underlayer, Rm is the sheet resistance of the magnetoresistive element layer, Rm is the sheet resistance of the magnetoresistive element layer, and Vn and Vm are outputs in the cases of the presence and absence of the conductive underlayer, respectively.

16. The magnetoresistive head according to one of claims 1 to 3, wherein the conductive underlayer is an anti-ferromagnetic film.

17. The magnetoresistive head according to claim 16, wherein the conductive underlayer has a resistance given as $$Ru>Rm/((Vu/Vm)^{-2/3}-1)$$

where Ru is the sheet resistance of the conductive underlayer, Rm is the sheet resistance of the magnetoresistive element layer, Rm is the sheet resistance of the magnetoresistive element layer, and Vn and Vm are outputs in the cases of the presence and absence of the conductive underlayer, respectively.

18. The magnetoresistive head according to claim 16, wherein the magnetoresistive element layer includes a first ferromagnetic layer, a conductive intermediate layer and a second ferromagnetic layer.

19. The magnetoresistive head according to claim 18, wherein the conductive underlayer has a resistance given as $$Ru>Rm/((Vu/Vm)^{-2/3}-1)$$

where Ru is the sheet resistance of the conductive underlayer, Rm is the sheet resistance of the magnetoresistive element layer, Rm is the sheet resistance of the magnetoresistive element layer, and Vn and Vm are outputs in the cases of the presence and absence of the conductive underlayer, respectively.

20. The magnetoresistive head according to claim 16, wherein the pair of longitudinal bias magnetic field application structures each comprise a soft magnetic layer coupled to the anti-ferromagnetic layer.

21. The magnetoresistive head according to claim 20, wherein the conductive underlayer has a resistance given as $$Ru>Rm/((Vu/Vm)^{-2/3}-1)$$

where Ru is the sheet resistance of the conductive underlayer, Rm is the sheet resistance of the magnetoresistive element layer, Rm is the sheet resistance of the magnetoresistive element layer, and Vn and Vm are outputs in the cases of the presence and absence of the conductive underlayer, respectively.

22. The magnetoresistive head according to one of claims 1–3 and 15, wherein the conductive underlayer has a resistance given as $$Ru>Rm/((Vu/Vm)^{-2/3}-1)$$

where Ru is the sheet resistance of the conductive underlayer, Rm is the sheet resistance of the magnetoresistive element layer, Rm is the sheet resistance of the magnetoresistive element layer, and Vn and Vm are outputs in the cases of the presence and absence of the conductive underlayer, respectively.

23. A magnetoresistive head comprising:
a magnetoresistive element layer;
a longitudinal bias magnetic field application structure over which said magnetoresistive element layer is formed;
a pair of electrodes which are each disposed about a respective portion of an outer surface of said structure; and
a conductive underlayer upon an upper surface of which said structure and said pair of electrodes are formed;
wherein the magnetoresistive element layer comprises a ferromagnetic magnetoresistive film and the longitudinal bias magnetic field application structure comprises a permanent magnet film and a film magnetically isolating the ferromagnetic magnetoresistive film and the permanent magnet film from each other, the permanent magnet film applying a traversal bias magnetic field and a longitudinal bias magnetic field to the ferromagnetic film.

24. The magnetoresistive head according to claim 23, wherein the magnetoresistive element layer and the structure are patterned to be of the same shape.

25. The magnetoresistive head according to claim 24, wherein each one of said pair of electrodes is in one of a first arrangement and a second arrangement, wherein in said first arrangement said each one of said pair of electrodes is disposed in contact with vertical surface portions of said structure, and wherein in said second arrangement said each one of said pair of electrodes is spaced apart from said vertical surface portions of said structure.

26. A magnetoresistive head comprising a magnetoresistive element layer, a pair of longitudinal bias magnetic field application permanent magnet films and a pair of electrodes which are each disposed on one of said pair of permanent magnet films, wherein the magnetoresistive element layer and the pair of longitudinal bias magnetic field application permanent magnet films are disposed on a conductive underlayer which provides a around for each one of said pair of permanent magnet films, said conductive underlayer comprising chromium.

* * * * *